US007499470B2

(12) United States Patent
Calvignac et al.

(10) Patent No.: US 7,499,470 B2
(45) Date of Patent: *Mar. 3, 2009

(54) SEQUENCE-PRESERVING DEEP-PACKET PROCESSING IN A MULTIPROCESSOR SYSTEM

(75) Inventors: Jean Louis Calvignac, Cary, NC (US); Mohammad Pevravian, Morrisville, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/963,898

(22) Filed: Dec. 24, 2007

(65) Prior Publication Data

US 2008/0095170 A1 Apr. 24, 2008

Related U.S. Application Data

(63) Continuation of application No. 09/912,781, filed on Jul. 25, 2001, now Pat. No. 7,327,759.

(51) Int. Cl.
*H04J 3/24* (2006.01)
(52) U.S. Cl. .................. 370/474; 370/410; 370/426; 370/469
(58) Field of Classification Search .......... 370/229, 370/230, 230.1, 359, 360, 389, 394–400, 370/412–419, 409, 410, 422, 426, 464, 465, 370/466, 469, 474, 475
See application file for complete search history.

(56) References Cited

U.S. PATENT DOCUMENTS

| 5,819,290 | A | 10/1998 | Fujita |
| 5,860,119 | A | 1/1999 | Dockser |
| 6,147,996 | A | 11/2000 | Laor et al. |
| 6,173,386 | B1 | 1/2001 | Key et al. |
| 6,205,543 | B1 | 3/2001 | Tremblay et al. |
| 6,253,307 | B1 | 6/2001 | Boutaud et al. |
| 6,351,454 | B1 | 2/2002 | Crocker et al. |
| 6,519,248 | B1 | 2/2003 | Valko |
| 6,654,374 | B1 | 11/2003 | Fawaz et al. |
| 6,693,905 | B1 | 2/2004 | Ishimura et al. |

(Continued)

*Primary Examiner*—Wing F. Chan
*Assistant Examiner*—Mark A. Mais
(74) *Attorney, Agent, or Firm*—Joscelyn G. Cockburn; James A. Lucas; Driggs, Hogg, Daugherty & Del Zoppo Co., LPA

(57) ABSTRACT

Packets or frames of data may be compressed, encrypted/decrypted, filtered, classified, searched or subjected to other deep-packet processing operations before being distributed through the internet. The microprocessor system and method of the present invention provide for the orderly processing of such data packets without disrupting or changing the sequence in which the data is intended to be transmitted to its destination. This is achieved by receiving frames into an input buffer for processing. Associated with this input buffer is a unit for determining the operation to be performed on each frame. An arbitrator assigns each frame to a processing core engine. An output buffer collects the processed frames, and a sequencer forwards the processed frames from the output buffer to their destination in the same order as received by the input/output buffer. Maintaining the sequence of data transmission is particularly useful in voice transmission, such as videos and movies.

2 Claims, 3 Drawing Sheets

U.S. PATENT DOCUMENTS

| | | |
|---|---|---|
| 6,711,357 B1 | 3/2004 | Brewer et al. |
| 6,836,808 B2 | 12/2004 | Bunce et al. |
| 6,876,657 B1 | 4/2005 | Brewer et al. |
| 6,947,430 B2 | 9/2005 | Bilic et al. |
| 7,072,970 B2 | 7/2006 | Georgiou et al. |
| 7,327,759 B2 * | 2/2008 | Calvignac et al. ........... 370/474 |
| 7,333,493 B2 * | 2/2008 | Basso et al. ................. 370/394 |
| 7,380,101 B2 * | 5/2008 | Wright et al. ................. 712/19 |

* cited by examiner

SEQUENCE-PRESERVING DEEP-PACKET PROCESSING IN A MULTIPROCESSOR SYSTEM

RELATED APPLICATION

This application is a continuation of application Ser. No. 09/912,781, filed Jul. 25, 2001.

FIELD OF THE INVENTION

This invention relates to the field of multiprocessors. More specifically, it relates to the field of information management and transmission.

BACKGROUND OF THE INVENTION

The processing of packets or frames has traditionally been carried out by a network server. Each packet contains a header and data. The header provides some generic instructions or information, such as IP source or destination information, or control information. However, at times, such as an HTTP request, the instructions may not be contained in the header and can only be ascertained by going beyond the header and delving into the data itself. This is called 'deep-packet' processing. The necessity of searching beyond the header into the data unduly increases the amount of time consumed by the network server in processing the packets.

As internet traffic increases, the deep-packet processing functions, such as packet compression, encryption, filtering, classification, and searches are being moved from the network server to the edges of the network where these processing functions can be conducted by so-called edge equipment, such as load balancers, TCP/IP offload equipment, routers, switches, firewall devices and others.

At the network edge, there is a demand for a high-throughput of 10 Gbps or higher deep-packet processing elements. Given that the deep-packet processing functions require a large number of operations on packet data, it is necessary to perform these functions on multiple packets in parallel using multiple processing engines. Some communication protocols require that packets be delivered to the destination in the order of transmission. Situations in which maintaining the sequence of data transmission is particularly useful are voice transmission, such as those involving videos and movies. Therein, it becomes necessary for multiprocessing systems to preserve packet sequences.

BRIEF DESCRIPTION OF THE INVENTION

The present invention provides a means of preserving the sequence in deep-packet processing operations in a multiprocessor system. The means includes a system and method for transmitting multiple data frames to processing functions in a given sequence, performing the processing on the frames and forwarding the processed frames to their destination in the same sequence as they are received by the processing functions. The steps involved in this procedure include initially receiving frames into an input buffer for processing. Associated with this input buffer is a unit for determining the operation to be performed on each frame. An arbitrator assigns each frame to a processing core engine. An output buffer collects the processed frames, and a sequencer forwards the processed frames from the output buffer to their destination in the same order as received by the input/output buffer. The input buffer and output buffer typically are part of a Data Moving Unit. The unit for determining the operation to be performed on the packet is a Frame Header Processing Unit. This unit typically reads the header of each frame or packet. Each of the core engines has an associated memory for storing a frame assigned to the engine until the engine is free to perform the operation on the frame.

The invention also relates to a multiprocessing system and its method of operation wherein the system includes means for preserving the sequence in which multiple data frames are transmitted to processing functions and the processed frames are forwarded to their destination. The sequence in which the frames or packets are preserved is achieved by use of a) an input buffer for receiving frames for processing; b) a unit for determining the operation to be performed on each frame; c) an arbitrator for assigning each frame to a processing core engine; d) an output buffer for collecting the processed frames; and e) a sequencer for forwarding processed frames from the output buffer to their destination in the same order as received by the input/output buffer. Preferably, the input buffer and the output buffer are part of a Data Moving Unit. The unit for determining operation typically is a Frame Header Processing Unit. Each core engine typically has an associated memory for storing a frame assigned to the engine until the engine is free to perform the operation on the frame.

The invention also relates to a system and method for transmitting multiple data frames to processing functions in a given sequence, performing the processing on the frames, and forwarding the processed frames to their destination in the same given sequence. This is achieved by providing an input buffer for receiving frames for processing, said buffer having a buffer capacity of at least twice the size of the largest packet size. A Frame Header Processing Unit is used to determine the type of processing operation that is to be performed on each frame. A plurality of processing core engines is provided for the purpose of conducting deep-packet processing on each of the frames. Each core engine has an associated memory for storing a frame assigned to the engine until the engine is free to perform a processing operation on the frame. An arbitrator assigns an ascending frame sequence number to each frame and forwards each frame to one of the core engines for deep-packet processing. If a frame requires subsequent processing steps, it is forwarded to additional core engines. An output buffer collects each frame as the processing is completed by one or more core engine. This buffer comprises a portion of the Data Moving Unit. A sequencer forwards processed frames from the output buffer to their destination in the same order as they are received by the input buffer.

DETAILED DESCRIPTION OF THE INVENTION

Figure 1:
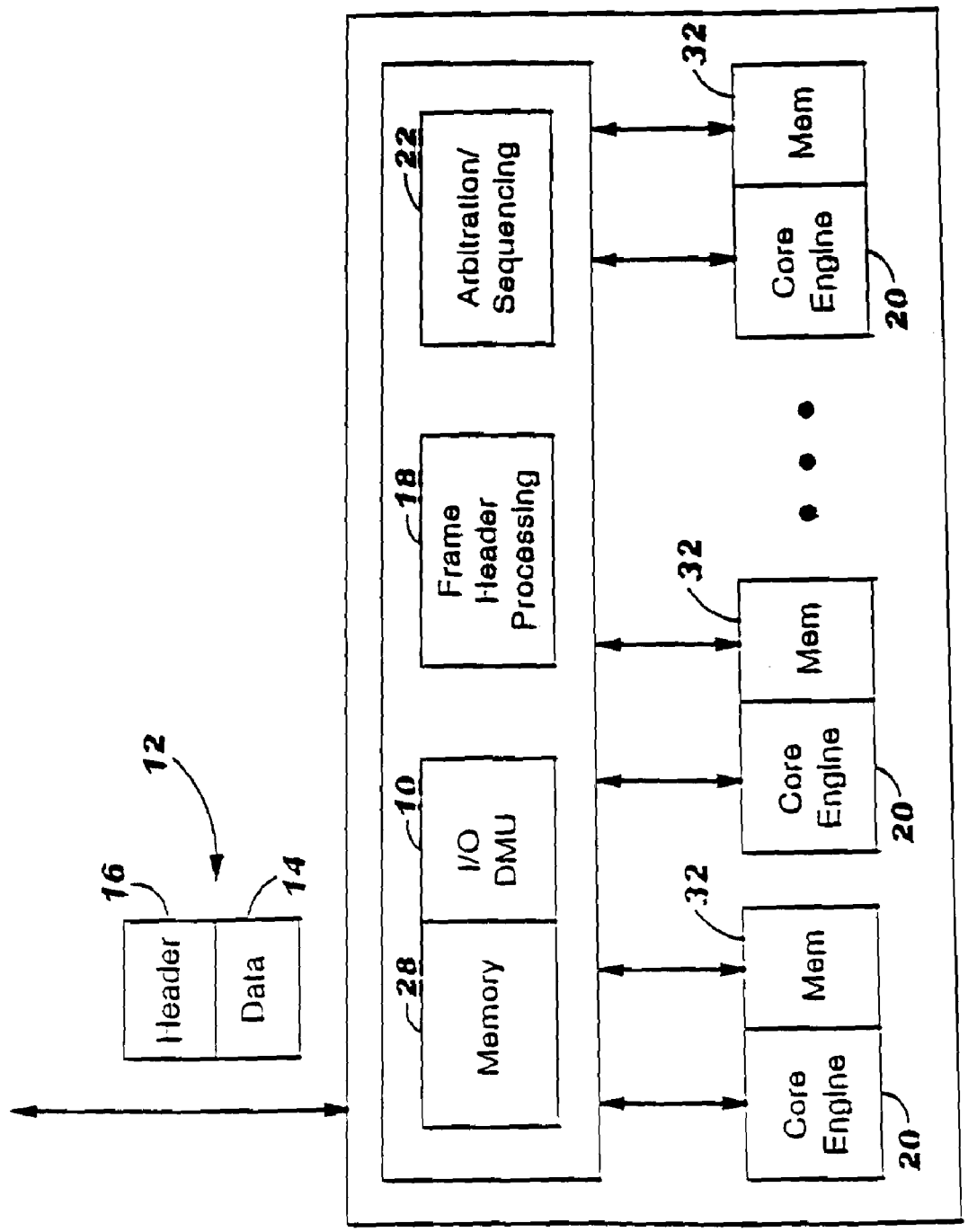
FIG. 1 is a block diagram showing the general structure of a deep-packet processing system.

With reference to the drawings, FIG. 1 shows the general structure of a deep-packet multiprocessing system. It includes a Data Moving Unit (DMU) 10 that serves as the input/output (I/O) interface for frames 12 and is responsible for receiving and transmitting frames. The terms 'packet' and 'frame' are used interchangeably throughout this description. The DMU includes a memory 28 for storing arriving and departing frames. For the purposes of this discussion, each frame 12 will be deemed to have a "header" field 14 and a "data" field 16. The header defines the basic operations, such as compression, encryption, etc. A Frame Header Processing Unit 18 is responsible for processing the frame header and for determining what operation needs to be performed on the frame data. Each core engine 20 includes its own memory 32. There are N identical core engines 20 or core macros for performing intensive operations on frame data. An arbitration/sequencing unit 22 is in charge of assigning and forwarding the frames to core engines 20 for deep-packet processing and for maintaining sequencing of the frames.

Figure 2:
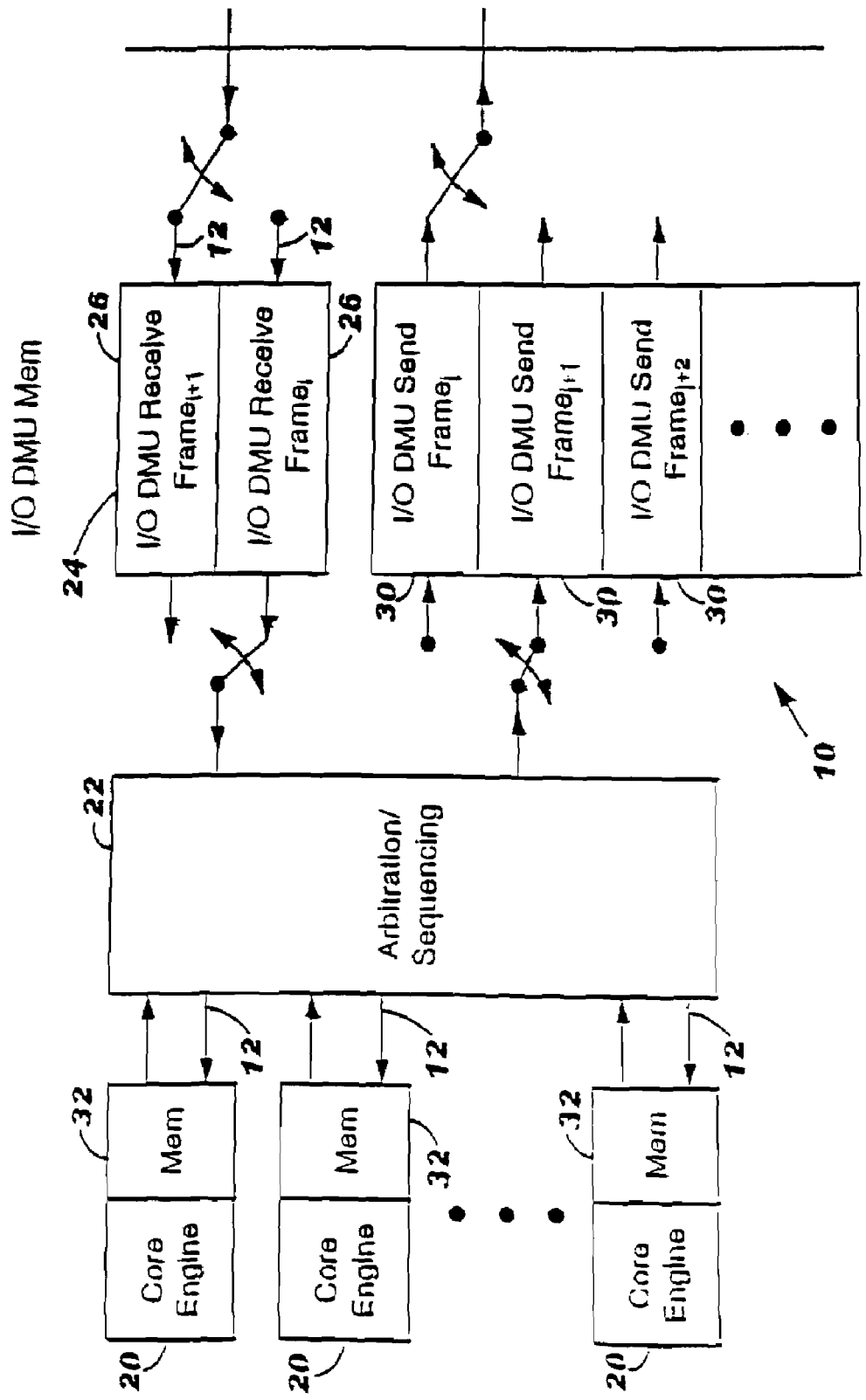
FIG. 2 is a block diagram showing the interaction between core engines and a Data Moving Unit.

FIG. 2 shows a frame send/receive Data Moving Unit 10 that interacts through the arbitration/sequencing unit 22 with the core engines 20. On the I/O DMU receive frame side 24, there is enough buffer space to store at least two frames of size M, where M is the maximum anticipated frame size, typically measured in bytes. For example, if M=20 Kbytes, then the size of the receive buffer is 40 Kbytes. Each buffer must be able to simultaneously receive and transmit frames of maximum size to avoid a loss of speed and efficiency. As a frame 12 arrives from an outside source, it is first stored in the receive buffer 26. The frame header is then processed and the frame is assigned by the arbitrator of the arbitration/sequencing unit 22 to the memory 32 of an available core engine 20 for deep-packet processing. To avoid losing frames, the Frame Header Processing Unit (18 in FIG. 1) must be able to meet the frame arrival rate. The arbitration/sequencing unit 22 assigns an ascending 'frame sequence number' (FSN) to each frame 12 as it gets assigned to a core engine 20. The FSN is used to order the frames for transmission. In other words, frames are assigned frame sequence numbers 0, 1, 2 and so forth. The FSN is increasing modulo K, where K is greater or equal to the maximum number of frames that can be in the system at any given time. The core engines operate on frames independently of one another. Once a core engine 20 has completed its processing of a frame 12, the engine returns the frame to the arbitration/sequencing unit 22. This unit 22 in turn places the frame in the I/O DMU send frame side buffer 30 for transmission. The frames are buffered and transmitted on the DMU send side according to their assigned FSNs in the ascending order. Thus, a frame with FSN=j+1 cannot be sent unless and until the frame with FSN=j has been sent or has been corrupted.

Figure 3:
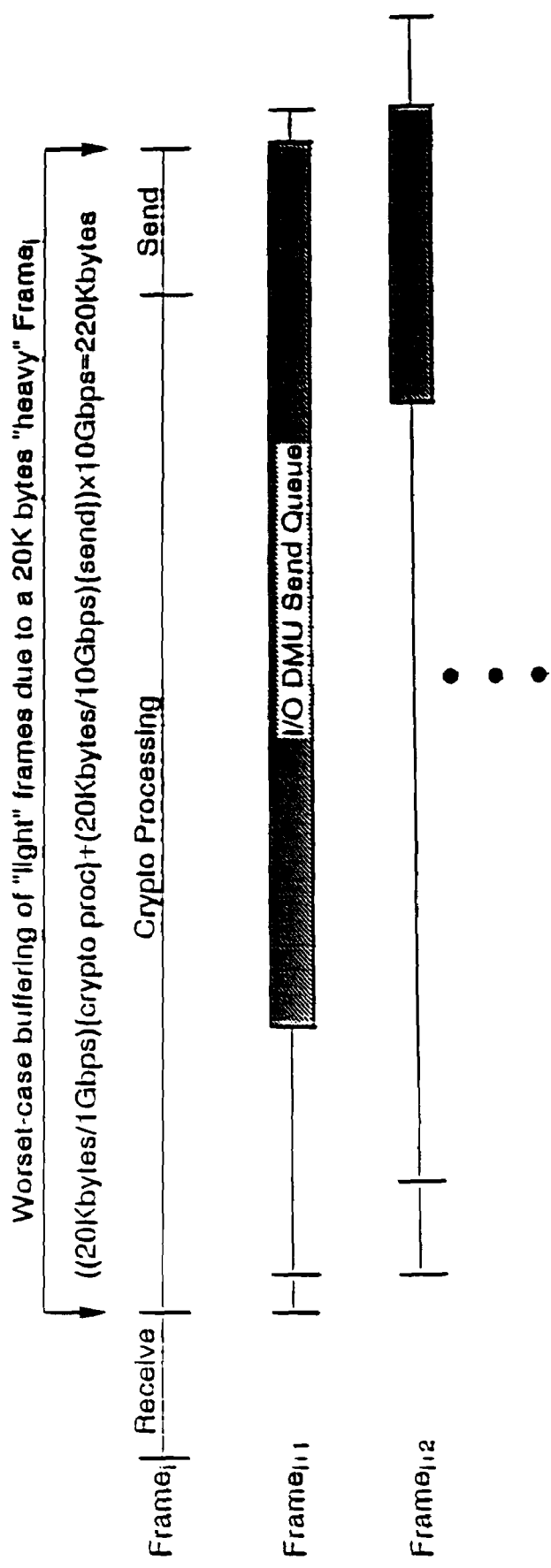
FIG. 3 illustrates the processing of multiple packets as a function of time.

Turning now to FIG. 3, this shows multiple packet processing as a function of time. It also shows the buffering of frames on the DMU send side 30. Assume that each core engine has a worst-case throughput of 1 Gbps, such as you might get for TDES encryption. If a worst-case throughput of 10 Gbps is desired, then it is necessary to have at least 10 core engines in the deep-packet processing system. Further, assume that the system is intended to support frames between 60 bytes (representing a 'light' frame) and 20 Kbytes (representing a 'heavy' frame). This would require the system to process 10 Gbps÷60 bytes=20.8 million frames per second in the worst case scenario. The memory requirement for frames would be about 480 Kbytes. This is based on the use of 10 core engines, each requiring about 20 Kbytes of memory for a total of 10×20=200 Kbytes. There are 2×20 or 40 Kbytes for the I/O DMU receive side and about 20+220=240 Kbytes for the I/O send side.

It should be understood that the packet sequencing of the present invention can be carried out even if multiple processing steps must be performed on some packets. For example, a packet may first be compressed, then encrypted and then searched to see what kind of information it contains, such as the HTTP address that indicates which network server is to receive the packet.

The invention contemplates that the core engines can all be the same type of engine; for example, all having the capacity for performing deep searches. On the other hand, some core engines can do searching, others encrypt/decrypt and others compress the data. They can be used in any combination. When multiple operations are to be conducted on a frame, the frame is transferred from the core memory of one engine to the core memory of another engine. The transfer typically is performed through the arbitration/sequencing unit. However, it should also be understood that if separate paths are provided between engines, the packets can be transferred directly from one core memory to another without the necessity of going through the arbitration/sequence unit.

The details of processors are known to persons of ordinary skill in the art and do not comprise a part of the present invention, except to the extent that they have been modified to become part of the overall architecture of the network processor system and to interengage with the specific function coprocessors and other components of the system. The specific details, including the architecture and the programming of the individual coprocessors useful in the present invention, are not deemed to comprise a part of the present invention.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A system for transmitting multiple frames, each frame having a header field and a data field, for deep packet processing of the data field, said frames transmitted in a given sequence, for performing the deep packet processing on the data field of each of the frames, and for forwarding the processed frames to their destination in the same given sequence, comprising:
   a) an input buffer for receiving frames for processing, having a buffer capacity of at least twice the size of the largest frame size, said buffer incorporated into a Data Moving Unit;
   b) a Frame Header Processing Unit for determining the type of deep packet processing operation to be performed on each frame;
   c) a plurality of processing core engines wherein each core engine has its own deep packet processing operation to be conducted on the data field of a frame, and an associated memory for storing a frame assigned to the engine until the engine is free to perform said deep packet processing operation on the data field of the frame;
   d) an arbitrator for assigning an ascending frame sequence number to each frame, for selecting a core engine based upon the type of operation to be performed on the data field of each frame, and for forwarding each frame to the selected core engine for deep-packet processing;
   e) an output buffer for collecting each frame as it is processed by a core engine, said buffer having a buffer capacity of at least twice the size of the largest frame size and comprising a portion of the Data Moving Unit; and
   f) a sequencer for forwarding processed frames from the output buffer to their destination in the same order as they are received by the input buffer.

2. The system according to claim 1 including more than one core engine for a given type of deep packet processing operation, said arbitrator selecting which of the more than one core engines is to be used for said processing operation on a given frame.

* * * * *